Figure 1:
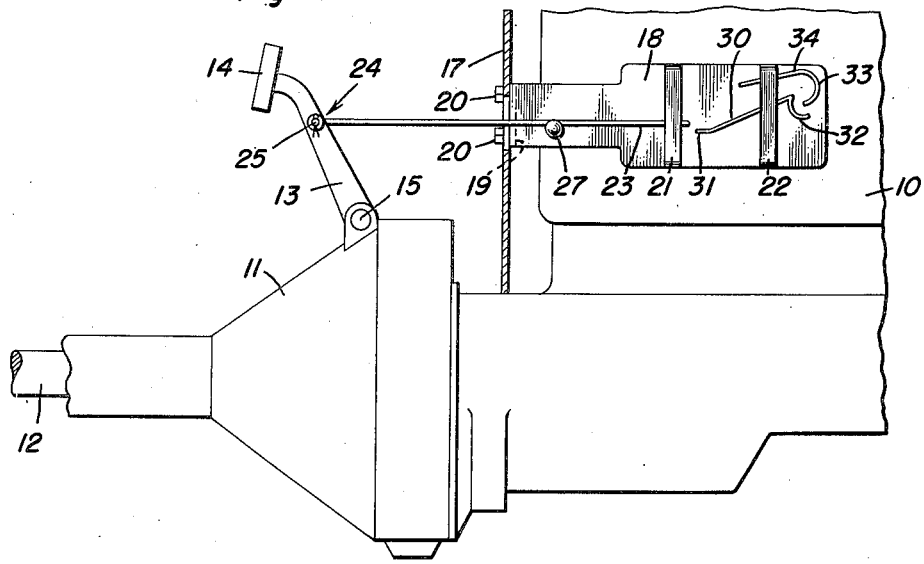

May 9, 1950 S. SKARPHOL 2,506,899
CLUTCH RELEASE ATTACHMENT
Filed April 4, 1946 2 Sheets-Sheet 1

Inventor
Sigurd Skarphol

By Clarence A. O'Brien
and Harvey B. Jacobson
Attorneys

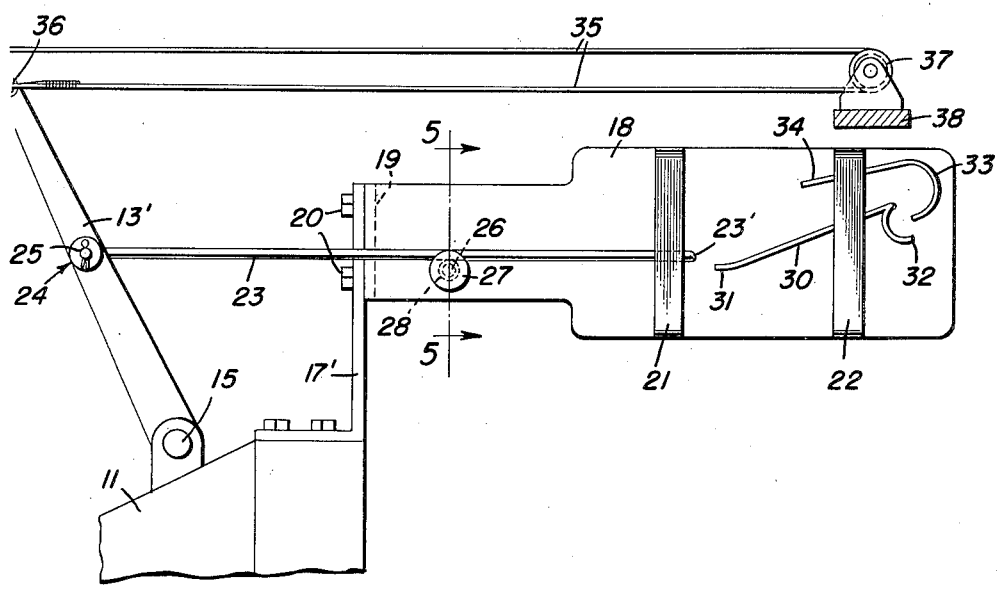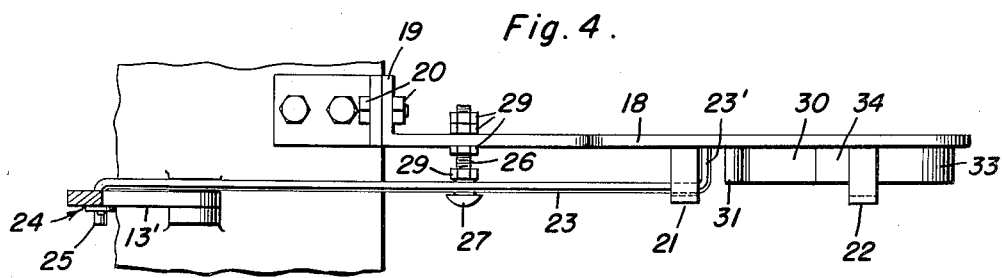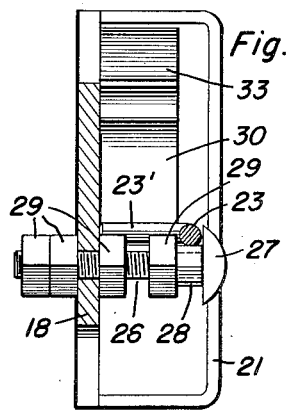

Patented May 9, 1950

2,506,899

UNITED STATES PATENT OFFICE 2,506,899

CLUTCH RELEASE ATTACHMENT

Sigurd Skarphol, Souris, N. Dak.

Application April 4, 1946, Serial No. 659,537

3 Claims. (Cl. 192—109)

1

This invention relates to clutches for automobile engines, tractor engines, or implements employing a clutch, for releasing or disengaging the clutch and causing delayed engagement thereof.

Another object of the invention is to provide an attachment for a clutch pedal or lever adapted to be operated directly by a foot pedal or lever, or from a distant point, for disengaging the clutch so that it will be momentarily held out of engagement during a short time interval and then re-engaged thereafter automatically to resume the driving connection to continue its regular operation.

A still further object of the invention is to provide a clutch release attachment which can be applied to automobiles, tractors, or other implements using a clutch, and having means to release the same at the foot pedal or lever, or from a distant point, as from a coupled tractor, and which may be temporarily held in a disengaged position or held in a locked position with the clutch engaged, with a time interval between the disengagement and engagement of the clutch.

Figure 2:
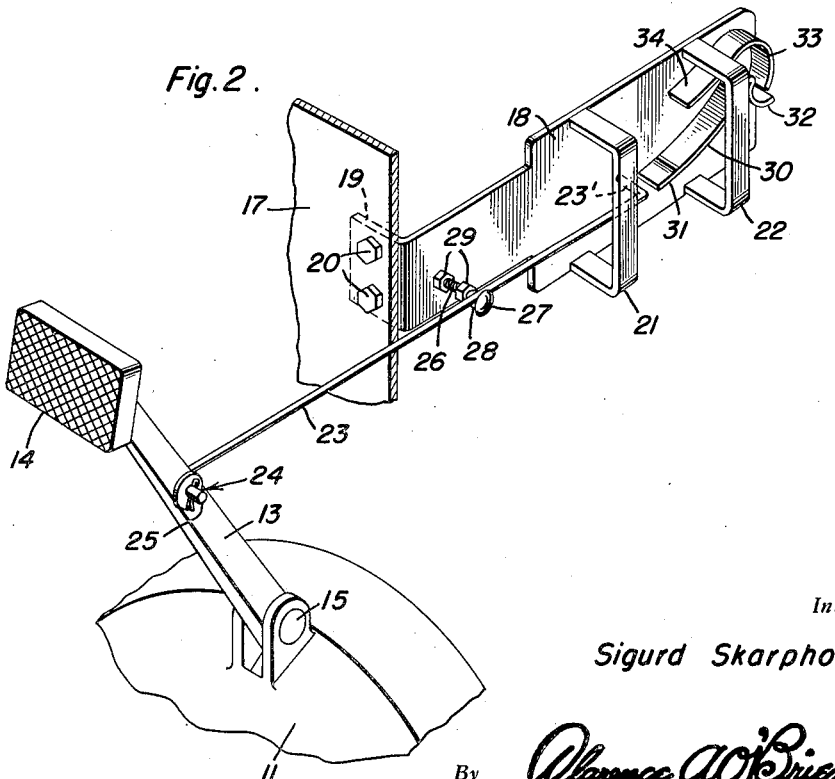

Other objects and advantages reside in the details of construction and operation as more fully hereinafter described and claimed, reference being had to the accompanying drawings forming part hereof, wherein like reference numerals refer to like parts throughout, and in which:

Figure 1 is a side elevation showing the clutch release attachment applied to an engine of an automobile or tractor in its initial position when the clutch is engaged, Figure 2 is a perspective view of the device in position before disengagement of the clutch, Figure 3 is a side elevation showing the device connected to a lever for operation in connection with a tractor, implement or clutch of a tractor or implement coupled to another implement, propelling means, or machine, and showing the parts in position in solid lines before release of the clutch, and in dotted lines upon release thereof, Figure 4 is a plan view of the structure shown in Figure 3, and Figure 5 is a vertical sectional view taken on the staggered section line 5—5 of Figure 3.

Referring to the drawings in detail, in which like reference characters designate corresponding parts throughout the several views, 10 designates the motor or engine, usually of the internal combustion or Diesel type, as employed in connection with automobiles, tractors, or other machines or implements having the usual flywheel housing 11 and transmission gearing, from which the drive shaft 12 extends rearwardly. In Figures 1 and 2, the clutch pedal or lever is indicated at 13 and is shown provided with a foot plate 14, the clutch lever or pedal being pivoted at 15 and having the usual connection for operating the clutch to engage and disengage the same. The clutch is operated, released or disengaged by swinging the pedal or lever forwardly, in or by depressing the same, and is engaged by releasing the pedal or lever, the pedal returning automatically by spring mechanism, as common in connection with automobiles, tractors and other implements. However, inasmuch as the detail of the spring structure and means for automatically causing engagement of the clutch, as well as the clutch structure itself, forms no part of the present invention, further details thereof are considered unnecessary.

As shown in the drawings, the clutch release attachment, which causes delayed engagement of the clutch after release, is applied to the automobile or tractor having the usual dash or instrument panel 17, and attached to the motor or engine 10, or other suitable place convenient in front of the panel or dashboard 17, is a base plate or supporting member 18, shown provided with an angular end 19 bolted to the panel or board 17, as indicated at 20, so as to be disposed vertically on edge in an upright position. The base plate 18 is elongated horizontally and may be otherwise suitably supported in position. At spaced points thereon, it bears a pair of spaced parallel vertical straps or loops 21 and 22 forming guide members for a rod 23 which is pivotally connected to the foot pedal or lever 13, as indicated at 24, to swing on a horizontal axis, as by means of a pin 25, or otherwise. This rod 23 is supported and rides on a horizontal supporting and guide member 26 which may be carried by the plate 18 or an extension thereof secured to the panel board 17 with a head forming a retaining member or stop 27 at its free end to prevent displacement of the rod 23 therefrom, and a suitable roller or anti-friction means may be provided thereon, if desired, as indicated at 28. The support or guide member 26 is held in position as by means of nuts or other spaced clamping or stop means 29, mounted on the rod, as by threading the same thereon on opposite sides of the base plate 18, to secure the supporting member in a horizontal position so that the rod 23, while free to move upwardly on the pivot 24, cannot swing downwardly beyond a certain point. The plate also carries guiding, supporting and retaining means for rod 23 and end 23' consisting of a spring strip 30 arranged at an inclined position on the plate edgewise in a horizontal direction and having its free end 31 extending horizontally and adapted to flex, if desired, to engage an angular inturned end 23' of the rod 23, so as to friction therewith and retard the rod in moving to released or clutch-disengaged position of the foot pedal or lever. The upper, inner end of the strip 30, which forms a guide support and retaining member for rod 23 and end 23', is provided with a depending, arcuate retaining portion 32, concaved at the front and disposed beneath an ogee or hook-shaped curved plate or guide 33 curved in an opposite direction to the curvature of the portion 32 disposed thereabove and also extending horizontally from the plate 18. The curved guide plate or member 33 has a straight or rectilinear portion 34 extending over the plate or strip 30 to form a channel with the rear end of the latter and the curved portion is adapted to guide the end 23' of the rod 23 downwardly into the arcuate portion 32, in which it may be momentarily retained to hold the clutch disengaged when the pedal 14 is pressed in or down to disengage the clutch as usual, until end 23' drops out of portion 32 or the same is released by pressing the clutch pedal or lever forwardly and then releasing it, during which interval the rod 23 and end 23' will drop down by its weight below the part 32 and return under the strip 30 and the resilient horizontal end 31, where it may be held momentarily by frictional engagement of the end 23' upwardly thereagainst due to the rod 23 being supported on the member 26 and the end 31 being slightly below same as seen in Figure 1 whereby the clutch will be gradually reengaged. During this movement, the support member 26 will limit the downward movement but permit the rod to pass under the part 31 and upon being moved forwardly will be in position above the said part 31 to again engage the clutch release delaying device, as before described. Thus, there will be a time interval or delayed motion action between the disengagement and engagement of the clutch, for any desired purpose in the operation of a machine, a tractor, or a machine or element driven thereby, as when striking an obstruction, turning around, or for other purposes when desired to disconnect the motor from the shaft.

While the foot pedal or lever 13 may be used in connection with an automobile engine, tractor, or other machine or implement, it is shown in Figures 3, 4, and 5 as applied to a motor of any of such elements, and may be applied to a tractor, in this instance, to control the operation of another machine or implement such as a farm or agricultural machine or implement, or otherwise, which may be drawn or guided by the tractor or operated therefrom. In this form, instead of the foot pedal or short lever 13 having the foot plate 14 for depressing and disengaging the clutch which is normally engaged by a spring as previously described, and as is well known in the art, is replaced by a lever 13' connected to the rod 23 in the same manner as heretofore described. However, in this instance, the lever may be relatively long and extending upwardly for a considerable distance, and connected to the foot pedal lever 13, as previously described, and the upper end thereof may have a cable or rope 35 connected thereto, as indicated at 36, and extended forwardly around a pulley 37 suitably supported, as indicated at 38, and then extended rearwardly to a machine or implement, to be controlled thereby. In this instance, operation of the clutch may operate a suitable mechanism or other clutch on the machine or element coupled to or drawn by the tractor so as to release the cable 35 when the clutch is disengaged, and to pull thereon when the clutch becomes re-engaged after the delayed time interval upon automatic return to its engaged position. Thus, the clutch release attachment may be used in connection with various mechanisms and will be positively retained in a released or disengaged position of the clutch, upon disengagement thereof for a short time interval, thereby delaying the re-engagement of the clutch automatically under its operating spring. The device is relatively simple in construction and operation, effective and will practically serve its purpose without complicated mechanism being involved in connection therewith, as described. It will effectively lock the clutch or pedal or lever in a released position momentarily, so as to delay the return action thereof to an engaged position upon each forward movement of the pedal or lever during its limited movement back and forth in operation.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having thus described the invention, what I claim is:

1. In combination with the substantially vertical releasing lever of a normally engaged clutch movable forwardly to release said clutch, of a rod pivoted at its rear end to said lever and having its forward end directed laterally, a vertical stationary supporting plate mounted in front of said lever, a supporting and guiding member for said rod mounted on said supporting plate, a member carried by and disposed on one side of said supporting plate forwardly of said supporting and guiding member and having a rearwardly inclined portion forwardly and upwardly along which the laterally directed end of the rod is adapted to move when the lever is swung forwardly to release the clutch, and a rear end portion having a recess into which the laterally directed end of the rod is adapted to lower to hold the clutch released when said laterally directed end of the rod rides off of the upper end of said inclined portion, said laterally directed end of the rod being adapted to drop below said recessed portion when moved further forward by further movement of the lever in the same direction so as to allow return movement of the rod and lever and engagement of the clutch.

2. The construction defined in claim 1, wherein said inclined portion is resilient and vertically yieldable and arranged to be frictionally engaged on its underside by the laterally directed end of the rod to retard return movement of the latter and the lever and thereby delay engagement of the clutch.

3. The construction defined in claim 1, wherein said inclined portion is resilient and vertically yieldable and arranged to be frictionally engaged on its underside by the laterally directed end of the rod to retard return movement of the latter and the the lever and thereby delay engagement of the clutch, and a curved member fixed to the supporting plate for guiding the laterally directed end of the rod into said recess.

SIGURD SKARPHOL.

REFERENCES CITED

The following references are of record in the file of this patent:

UNITED STATES PATENTS

| Number | Name | Date |
|---|---|---|
| 1,000,936 | Owen | Aug. 15, 1911 |
| 1,312,384 | Bryan | Aug. 5, 1919 |
| 1,448,105 | Bell | Mar. 13, 1923 |
| 1,467,658 | Thompson | Sept. 11, 1923 |
| 1,901,021 | Buss | Mar. 14, 1933 |

FOREIGN PATENTS

| Number | Country | Date |
|---|---|---|
| 38,445 | Switzerland | May 2, 1914 |